United States Patent Office 2,859,199
Patented Nov. 4, 1958

2,859,199

POLYMERIZABLE MIXTURE OF STYRENE AND A POLYESTER REACTION PRODUCT

Earl E. Parker, Milwaukee, Wis., assignor to Pittsburgh Plate Glass Company, Allegheny County, Pa., a corporation of Pennsylvania No Drawing. Application April 6, 1953
Serial No. 347,177

3 Claims. (Cl. 260—45.4)

This invention relates to resinifiable materials and to resins obtainable therefrom and it has particular relation to a resinifiable homogeneous composition derived from (A) an alpha-beta ethylenic, alpha-beta dicarboxylic compound providing a group of the structure

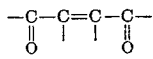

in which polymerizability is due to the structure =C=C= in conjunction with a carbonyl group and (B) a composition containing an esterifiable polyether of a phenolic compound containing a plurality of —OH groups.

It is an object of the invention to provide a resin which possesses improved chemical or physical properties in one or more of the following respects: hardness, resistance to impact, toughness, extensibility, clarity, chemical resistance and like properties. Other objects of the invention will be apparent from the description which follows.

It has heretofore been suggested to form compositions which are resinifiable by addition reaction and which comprise polyesters of (A) glycols such as ethylene glycol, propylene glycol, diethylene glycol, and the like and (B) alpha-beta ethylenic, alpha-beta dicarboxylic acids such as maleic acid or fumaric acid. These acids contain the group,

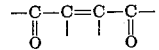

usually repeated a number of times and these groups in the polyester molecules have a marked functionality, being capable of addition reactions with adjacent molecules to produce latticing or polymerizing effects which harden the composition into resistant bodies without evolution of any volatile by-products such as water, often formed in many types of resins and which, if not eliminated, tend to make the resin products unstable. It has also been previously demonstated that the polyesters are capable of forming liquid interpolymerizable mixtures with ethylenic monomers, which monomers usually contain a >C=CH₂ group in terminal position. These groups are non-conjugate with respect to other ethylenic groups and usually are attached to a negative group. This type of interpolymerization and the products thereof are discussed in the Journal of Industrial and Engineering Chemistry, December 1939, pages 1512 to 1516 inclusive, and again in the same journal, January 1940, pages 64 to 68 inclusive. Many examples illustrating the preparation of this type copolymer are contained in the patent literature including Parker patent, U. S. 2,593,787 and U. S. Patents 2,409,633, 2,443,735 and many others.

It has also been recognized that useful resin products of high chemical resistance and high mechanical strength can be formed by interaction of epichlorohydrin, or similar compounds adapted to react to form the same type of products, with a phenolic compound containing a plurality of —OH groups. The resultant products are polyethers and most of them include at least some terminal glycidyl or epoxy groups or other groups capable of reaction with carboxyls to form esters of the polyethers.

A fairly typical structure of these polyether compounds may be represented as follows:

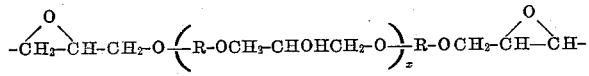

In the formula the group R represents the divalent, non-functioning hydrocarbon portion of a polyhydric phenol. X is a whole number of a magnitude dependent upon the degree to which etherification is conducted. The aliphatic portion of the chain between the groups R has been represented as being

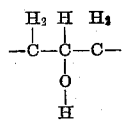

but manifestly, it could be a branch chain, could include a varying number of carbon atoms, e. g., 2 to 8 and the hydroxyl (—OH) also could be eliminated. Hydrogens could be replaced by other non-functioning groups such as chlorine, methyl, ethyl or the like. One or both of the terminal epoxy groups may sometimes be eliminated or replaced by OH, chlorine or the like. It will be understood that in most commercial polyether type resins available, there may be and probably are additional molecules other than the one represented by the typical formula; but the typical molecules are present in amounts adequate to provide a product capable of modifying polyesters in accordance with the provisions of the present invention.

One of the most important members of this class comprises the glycidyl polyethers resulting from the reaction of epichlorohydrin and such polyhydroxy phenols as 2,2' bis(hydroxy-phenyl) propane or 2,2' bis(hydroxy-phenyl) butane as disclosed in U. S. Patent 2,468,982. This reaction of etherification is promoted by the presence of a large amount of caustic, e. g. sodium hydroxide which splits off chlorine as sodium chloride from the epichlorohydrin.

This invention is based upon the discovery that the polyethers and notably the glycidyl polyethers of polyhydric phenols which contain groups such as epoxy

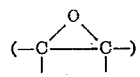

or the like, which groups are capable of reaction to form esters of carboxylic acids, are also capable of esterification reaction with polycarboxylic compounds containing one or a plurality of ethylenic groups in alpha-beta relation to at least one of the carboxyls. Needless to say, the polyethers containing an epoxy group or its equivalent are also capable of reactions with other compounds such as the anhydrides of polycarboxylic acids to form corresponding esters.

The products resulting from heating of the ethylenically unsaturated polycarboxylic compounds and the polyethers apparently are capable of polymerization reactions, for example, such as may be obtained by heating the polyesters of the acids in the absence of monomers, but in the presence of a catalyst, such as a peroxide, e. g. benzoyl peroxide, tertiary butyl hydroperoxide or the like. However, in accordance with the provisions of the present invention, particular importance is attached to the interpolymerization of said products and monomers containing a >C=CH₂ group as previously described.

While simple alpha-beta ethylenic dicarboxylic acids such as maleic acid, fumaric acid and the chloro or hydrocarbon substituted derivatives thereof, as well as the anhydrides of such acids, are capable of esterification with epoxy containing polyethers as herein disclosed, more importance is attached to the compositions obtained by admixing said polyethers with polyesters of the type disclosed in Parker Patent 2,593,787 and the other references previously alluded to. By such application of the polyether compounds it is possible, by the application of a relatively small amount of the polyether, advantageously to modify substantially larger amounts of the polyesters disclosed in the foregoing references, whereby to impart to them one or more properties which may be desired. For example, by addition of a relatively small amount of the polyether type compound, the chemical or physical resistance of the resultant polyester product may be greatly improved. The compatible mixtures of the reaction products of the two types of resinifiable materials and mixtures thereof with ethylenic monomers can be cast, or spread as films and then cured in much the same manner as the polyesters of alpha-beta ethylenic, alpha-beta dicarboxylic acids, or preferably the mixtures of the polyesters and the ethylenically unsaturated monomers. It is also within the scope of the invention to apply liquid mixtures of the novel materials to fibrous mats and fabrics by impregnation, dipping, spreading or otherwise and then to cure the materials in a subsequent stage to the desired degree of hardness or resistance to chemical or physical attack by various chemical reagents, weathering or the like. Obviously, several plys of the fibrous materials after impregnation or other suitable application of the resinifiable material may be laid up together and cured to form laminates.

In the practice of this invention a wide selection of polyesters of alpha-beta ethylenic dicarboxylic acids and polyhydric alcohols are readily available for modification by polyethers of polyhydric phenols. These include the various interpolymerizable mixtures of the polyesters of such interpolymerizable mixtures as disclosed in the previously mentioned patent to Parker or any of the other references herein disclosed as well as many additional materials of similar nature.

In the preparation of suitable polyesters a dicarboxylic acid such as maleic acid, fumaric acid, itaconic acid, or the like is inter-esterified in accordance with conventional techniques with a glycol such as ethylene glycol, diethylene glycol or polyethylene glycol, having a molecular weight, for example, of 300 to 2000 or thereabouts, propylene glycol and many others. In many instances, dicarboxylic acids free of ethylenic unsaturation and being represented by phthalic acid, terephthalic acid, tetrachlorphthalic acid, succinic acid, adipic acid, azelaic acid, sebacic acid, and others may be added. These latter types of acids are not essential components of the mixture since the polyesters of dicarboxylic acids containing ethylenic unsaturation are quite susceptible of use without modification. In event that a dicarboxylic acid free of ethylenic unsaturation is employed in the polyesters, a molar ratio within a range of 0.25 to 15 moles of the latter acid per mole of the alpha-beta ethylenically unsaturated acid is preferred.

The glycol or polyhydric alcohol component of the polyester is usually stoichiometric or in slight excess thereof with respect to the sum of the acids of the copolymerizable mixture. The excess of polyhydric alcohol will seldom exceed 20 percent and usually is about 10 percent. It assists in the attainment of a low acid value in the polyester.

While reference has been made to dicarboxylic acids in the preparation of the ethylenically unsaturated polyesters, it will be appreciated that anhydrides thereof will react with the glycols to form the same ester products and where they exist the anhydrides usually are preferred to the free acid. The term "acid" as employed herein is generic in meaning.

In the preparation of polyethers of phenols suitable for modification of polyesters of ethylenically unsaturated dicarboxylic acids or for modification by the acids themselves, various polyhydric phenolic compounds may be employed. These include mono-nuclear phenols such as resorcinol, catechol, hydroquinone, methyl resorcinol, para tertiary butyl catechol and the like. Preferred polyhydric phenols, however, comprise a plurality of hydroxy phenol groups attached to an intermediate hydrocarbon chain through nuclear substitution. This type of polynuclear phenols may readily be prepared by condensation of phenolic molecules with a compound containing a carbonyl group, such as a ketone or aldehyde. This reaction is disclosed in U. S. Patent 2,468,982 previously referred to. A partial list of polynuclear phenols for use in the practice of the present invention includes such compounds as bis(4-hydroxyphenyl) 2,2-propane; 4,4'-dihydroxy benzophenone; bis(4-hydroxyphenyl) 1,1-ethane; bis(4-hydroxyphenol) 1,1-isobutane; bis(4-hydroxyphenyl) 2,2-butane; bis(4-hydroxy 2-methyl phenyl) 2,2-propane; bis(4-hydroxy 2-tertiary butyl phenyl) 2,2-propane; bis(2-dihydroxy naphthyl) methane; 1,5-dihydroxy naphthalene and others.

In forming polyethers of the polyhydric phenols suitable for modifying the polyesters of alpha-beta ethylenically unsaturated dicarboxylic acids, various techniques are permissible. However, a preferred method involves condensation of the phenolic compound with an epoxy compound containing a halogen group such as chlorine. In this reaction, as previously indicated, caustic is usually added, for example, in an amount in excess of stoichiometric ratio in order to effect the splitting off of the halogen, thus forming the glycidyl polyether as previously represented.

Appropriate halogen substituted epoxy compounds include 1-chloro 2,3-epoxy butane; 1-chloro 3,4-epoxy butane; 2-chloro 3,4-epoxy butane; 1-chloro 2-methyl 2,3-epoxy butane; 1-bromo 2,3-epoxy pentane; 2-chloro methyl 1,2-epoxy butane; 1-bromo 4-methyl 3,4-epoxy pentane; 1-bromo 4-ethyl 2,3-epoxy pentane; 4-chloro 2-methyl 2,3-epoxy pentane; 1-chloro 2,3-epoxy octane; 1-chloro 2-methyl 2,3-epoxy octane; and 1-chloro 2,3-epoxy decane. Of these various epoxy compounds, epichlorohydrin because of general commercial availability and relatively low cost, is usually preferred. Epichlorohydrins may be replaced by other compounds reacting with polyhydric phenols to form polyethers. Many glycidyl polyethers of polyhydric phenol compounds which may be employed in the practice of this invention have been described in the prior art. This art includes U. S. Patents 2,592,560; 2,506,486; 2,464,758; 2,302,363 and 2,060,715.

While the ethers of the polyhydric phenolic compounds may be readily prepared by techniques available, it is to be understood that such ethers are already available as commerical products in considerable variety and from several sources. For example, such glycidyl polyethers of bis(hydroxy phenyl) alkanes and epichlorohydrin as are sold by the Shell Chemical Company under the trade name of Epon resins or by the Ciba Corporation under the trade name of Araldite resins, may be employed. In the several examples which are subsequently to follow, these commercial products were employed. However, any other esterifiable glycidyl ether of a polyhydric phenol, commercial or non-commercial, having suitable fluidity and compatibility can be substituted for the Epon or the Araldite compositions.

In the practice of the invention, the polyether component of the reaction mixture is usually added in such amount that the mixtures are predominantly polyesters, or mixture thereof, with the monomer component. For example, the polyether component may be employed in an amount of 1 to 35 or 40 percent by weight of the mixture of said polyether, polyester and monomer. A preferred range is about 5 to 15 percent by weight of the total mixture.

The mixture can be heated to effect solution of the several components, probably attended by reaction, for example, by esterification. A monomer such as styrene, vinyl acetate, diallyl phthalate, or the like, containing a $>C=CH_2$ group may then be added to the mixture or to the ester product derived from such mixture to provide an interpolymerizable mixture in which the monomer probably reacts by addition in well-known manner, with the ethylenic groups of the polyester to effect latticing. The monomer may also be omitted from the polyester-polyether composition. If a catalyst such as benzoyl peroxide, tertiary butyl hydroperoxide, or the like, is added and the mixture is heated for a sufficient period of time, addition reaction may occur between ethylenic groups in contiguous molecules, thus causing the material to cure to a hard, durable state. However, this type of reaction of necessity is relatively slow and unless considerable time is permissible in the curing operation, it is not to be preferred.

The interpolymer products of alpha-beta ethylenic dicarboxylic acid polyesters and glycidyl polyethers may be prepared by a plurality of different techniques. Likewise, the formation of interpolymers of the polyester-polyether products and monomers containing the $$>C=CH_2$$

group is not limited to a single procedure.

According to one procedure, a preformed glycidyl polyether such as is prepared by the reaction of a bis(hydroxyphenyl) alkane and epichlorohydrin may be heated with a polyester of an alpha-beta ethylenic dicarboxylic acid, the latter preferably being present in a substantial excess, until the two components go into homogeneous solution. Possibly some degree of esterification reaction occurs between free carboxyls of the polyester and the residual epoxy groups of the glycidyl polyether.

It is also within the scope of the invention to pre-esterify the polyether containing available hydroxy or epoxy groups with an ethylenically unsaturated dicarboxylic acid such as fumaric acid, maleic acid, itaconic acid, or the like. It is desirable to include a monohydric alcohol such as ethyl, methyl or butyl alcohol in the reaction mixture in order to prevent gelation during the course of the reaction. This ester product can be mixed with a monomer and subjected to copolymerization reaction in the presence of a peroxide catalyst by heating until reaction takes place.

It is further within the scope of the invention to effect the formation of the polyester of the alpha-beta dicarboxylic acid and a glycol in the presence of a glycidyl polyether of a dihydric phenol. In accordance with this embodiment of the invention, said ether, said glycol and the alpha-beta ethylenic, alpha-beta dicarboxylic acid, with or without an inert diluent such as xylene, toluene, or the like, is heated, preferably under an inert atmosphere such as an atmosphere of carbon dioxide, nitrogen or the like, until water is evolved and esterification occurs. Probably, the resultant products are mixed esters of the glycidyl ether, the glycol and the dicarboxylic acid. This product may be incorporated with an inhibitor such as tertiary butyl catechol or trimethyl benzyl ammonium chloride, after which a monomer such as styrene may be added to provide an interpolymerizable mixture.

When the products of any of these procedures are to be reacted by addition reaction with a monomer such as styrene, it is preferred to add a catalyst such as benzoyl peroxide or tertiary butyl hydroperoxide in appropriate amount and then to heat the mixture until the latter is converted into a hard, durable resin.

The monomers may be added to the polyester mixtures as modified by the polyethers of the dihydric phenols in an amount dependent upon the properties desired in the final product. A range of about 1 to 50 percent by weight based upon the total mixture is preferably utilized.

Any one of the several compositions or compounds of a polyester of an alpha-beta ethylenic dicarboxylic acid and a glycidyl polyether, as previously described with or without addition of monomers such as styrene, may be further incorporated with copolymerizable mixtures of monomers such as styrene and polyesters of alpha-beta ethylenic dicarboxylic acids to provide interpolymerizable compositions of high merit. Appropriate interpolymerizable mixtures of monomers containing a $>C=CH_2$ group and polyesters of alpha-beta ethylenic dicarboxylic acids are sold by the Pittsburgh Plate Glass Company under the trade name of Selectron Resins.

It has already been indicated that a wide variety of ethylenic compounds containing a $>C=CH_2$ group may be employed as monomers in compositions or reaction products of polyesters or components of polyesters and the glycidyl polyethers. The following constitutes a partial list of some of the more common monomers which may be incorporated with the compositions or reaction products.

(1) Monoolefinic hydrocarbons, that is, monomers containing only atoms of hydrogen and carbon, such as styrene, alpha-methyl styrene, alpha-ethyl styrene, alpha-butyl styrene, vinyl toluene, isobutylene (2-methyl propene-1), 2-methyl - propene - 1, 2 - methyl-butene - 1, 2-methyl-pentene-1, 2,3-dimethyl-butene-1, 2,3-dimethyl-pentene-1, 2,4-dimethyl-pentene-1, 2,3,3-trimethyl - butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3 - trimethyl - pentene - 1, 2,3,4 - trimethyl-pentene-1, 2,4,4-trimethyl-pentene-1, 2-methyl-octene-1, 2,6-dimethyl-heptene-1, 2,6-dimethyl-octene-1, 2,3-dimethyl-decene-1, 2-methyl-nonadecene-1, ethylene, propylene, butylene, amylene, hexylene and the like;

(2) Halogenated monoolefinic hydrocarbons, that is, monomers containing carbon, hydrogen and one or more halogen atoms such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5 - trichlorostyrene, dichloromonofluorostyrenes, 2-chloropropene, 2-chlorobutene, 2-chloropentene, 2-chlorohexene, 2-chloroheptene, 2-bromo-heptene, 2-fluorohexene, 2-fluorobutene, 2-iodopropene, 2 - iodo - pentene, 4-bromoheptene, 4-chloroheptene, 4-fluoroheptene, cis and trans-1,2-dichloroethylenes, 1,2-dibromoethylene, 1,2-difluoroethylene, 1,2 - diiodoethylene, chloroethylene (vinyl chloride), 1,1-dichloroethylene, (vinylidene chloride), bromoethylene, fluoroethylene, iodoethylene, 1,1-dibromoethylene, 1,1-difluoroethylene, 1,1-diiodoethylene, 1,1,2,2 - tetrafluoroethylene, 1,1,2,2 - tetrachloroethylene, 1-chloro-2,2,2-trifluoroethylene and the like;

(3) Esters of organic and inorganic acids such as vinyl acetate vinyl propionate; vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate; Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate and dodecyl acrylate;

Isopropenyl acetate, isopropenyl propionate, isopropenyl butyrate, isopropenyl isobutyrate, isopropenyl valerate, isopropenyl caproate, isopropenyl enanthate isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, diallyl phthalate, diallyl succinate, diethylene gylcol bis(allyl-carbonate) allyl 3,5,5-trimethylhexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thiocetate, as well as methallyl esters corresponding to the above allyl esters as well as esters from such alkenyl alcohols as beta-ethyl allyl alcohol, beta-propyl allyl alcohol, 1-buten-4-ol, 2-methylbuten-1-ol-4, 2(2,2-dimethylpropyl) - 1 - buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha- chloroacrylate, 3,5,5-trimethylhexyl alpha-chloroacrylate, decyl alpha-chloroacrylate, methyl alpha-cyano acrylate, ethyl alpha, cyano acrylate, amyl alpha-cyano acrylate and decyl alpha-cyano acrylate;

Dimethyl maleate, diethyl maleate, diallyl maleate, dimethyl fumarate, dimethallyl fumarate and diethyl glutaconate;

(4) Organic nitriles such as acrylonitrile, methacrylonitrile, ethacrylonitrile, 3-octenenitrile, crotonitrile, oelonitrile, and the like;

(5) Acid monomers such as acrylic acid, methacrylic acid, crotonic acid, 3-butenoic acid, angelic acid, tiglic acid and the like.

It is usually preferred to effect the blending of the monomers with the ester or polyester component containing the glycidyl polyether of a polyhydroxy phenol while the polyester is relatively warm; for example, at a temperature within a range of about 100 to 150 degrees C. Usually, one or both of the components should include an apropriate inhibitor of gelation. For example, a small, gelation-inhibiting amount (0.01 to 2 percent by weight based on the polyester) of a quaternary ammonium halide may be added. Other suitable gelation inhibitors include polyhydric phenols such as hydroquinone, tertiary butyl catechol and the like.

It has previously been indicated that many glycidyl polyethers of polyhydric phenols suitable for use in combination with alpha-beta ethylenically unsaturated polycarboxylic compounds as herein disclosed are available as commercial products and, accordingly, it is seldom necessary for the user to prepare the ether component as a preliminary to the preparation of the combinations of such component with the alpha-beta ethylenic polycarboxylic component. However, the following constitutes a convenient technique whereby glycidyl polyethers suitable for use in the practice of the invention may be prepared.

In accordance with the procedure a 110 gram quantity of Bisphenol A was mixed with 480 grams of water and 80 grams of sodium hydroxide. To this mixture, 188 grams of epichlorohydrin was added at a temperature of 32 to 40 degrees C. during a period of 1 hour. The temperature was held at 30 to 35 degrees C. for 6½ hours and the mixture was then further let stand overnight. The product comprising glycidyl polyethers was dissolved in 500 milliliters of acetone and the water layer was separated at a temperature of 40 to 50 degrees C. A 20 milliliter quantity of xylene was added and was then pumped off, likewise at a temperature of 40 to 50 degrees C. The product was vacuum-distilled at 37 degrees C. until a presure of 13 millimeters of mercury (absolute) was obtained. Distillation was continued until 88 grams of the product was distilled over. Vacuum distillation was then further continued to a temperature of 80 degrees C. and a pressure of 5 millimeters of mercury (absolute). A 110 gram portion of the product was thus removed. The remainder, constituting aproximately 100 grams, gelled in the still at 150 degrees C.

The resin fractions as thus obtained and comprising glycidyl polyethers of bis(4 hydroxy phenyl) propane in which at least some of the molecules are terminated by epoxy groups are suitable for combining with polyesters of alpha-beta ethylenic dicarboxylic acids and mixtures of such polyesters and monomers.

Interesterification of the polyesters such as those hereinafter disclosed and the glycidyl polyether may be conducted by heating a mixture of the two, oxygen preferably being excluded from the reaction zone. The temperature should be sufficient to effect esterification. However, the temperature should not be so high as to decompose the reactants or their product. Reaction is discontinued before infusible, insoluble resins are formed. At the conclusion of the esterification reaction between the polyester and its glycidyl polyether modifier, a gelation inhibitor such as tertiary butyl catechol or trimethyl benzoyl ammonium chloride is added in small, but gelation-inhibiting amounts. The monomer may then be added while the mixture is still hot, for example, at a temperature of about 120 degrees C.

In curing reaction products of or homogeneous mixtures of the foregoing glycidyl polyether of a bisphenol or its equivalent polyether and polyesters of glycols and dicarboxylic acids containing an alpha-beta ethylenic, alpha-beta dicarboxylic acid and mixtures of these with monomers containing a $>C=CH_2$ group, liquid mixtures of these resinifiable materials may be catalyzed with a catalyst of addition reaction such as benzoyl peroxide. The addition reaction is conducted at a moderate temperature, e. g. room temperature or higher. Amounts of catalysts are usually in a range of 0.1 to 5 percent by weight based upon the mixture. Curing is effected at a temperature in a range of about 75 to 300 degrees C. The catalysts may be conventional peroxides such as benzoyl peroxide, tertiary butyl hydroperoxide and others such as are disclosed in the Parker Patent 2,593,787 or other patents previously referred to.

The mixtures may be cast and cured in appropriate molds, or be spread on films or on sheets of fabric such as cloth or fiber mats. The mixtures are then baked in order to effect a cure. It is further within the spirit of the invention to mix the material with fibrous fillers such as cellulose fibers, wood flour and others and then to cast or mold them under heat and pressure.

Having thus described the more general features of the invention, the following examples are given by way of illustration of the application of such features.

*Example I*

In this example, a polyester was formed from propylene glycol and a mixture of equal moles of maleic acid and phthalic acid, the reaction being continued until a viscous, but soluble and fusible polyester was obtained. A 90 gram portion of this polyester was mixed with 10 grams of a commercial glycidyl polyether resin sold as Epon 1000. The latter was understood to comprise glycidyl polyethers of Bisphenol A and to contain terminal epoxy groups. The mixture was heated to about 150 degrees C. until a uniform solution was obtained and 0.24 gram of a 60 percent aqueous solution of trimethyl benzyl ammonium chloride constituting a gelation inhibitor was added. The mixture was then cooled to 120 degrees C. 50 grams of a monomer, namely styrene, was added. Subsequently, the resultant homogeneous solution was cooled to room temperature and at that point 0.015 gram of quinone were added as an additional gelation inhibitor.

The mixture was stable and could be stored for substantial periods of time without danger of premature gelation. When it was desired to cure this mixture into a hard, resinous product, a catalyst of addition reaction, namely a commercial product sold as Luperco ATC, was added in an amount of 3 percent by weight, based upon the reaction mixture. The catalyst is understood to comprise a mixture of equal parts by weight of benzoyl peroxide and tricresyl phosphate. The addition preferably was effected approximately at room temperature. Castings were made from the mixture in a cell comprising plates of glass spaced ⅛ of an inch by means of plastic spacers. The cure was effected in this cell by heating the mixture for one hour at about 170 degrees F., and subsequently for an additional hour at 250 degrees F. The resultant castings were clear and exhibited a strong adhesion to the glass, thus admitting of the formation of reinforced laminates by such casting operation. The adhesion between the glass and the plastic could be obviated by the application of an appropriate coating agent to the face of the glass before the casting operation. For this purpose lecithin is suggested.

*Example II*

In this example, the same polyester and the same glycidyl polyether resin disclosed in Example I were employed. These were blended together in the following proportions:

| | Grams |
|---|---|
| Polyester | 80 |
| Polyether | 20 |
| Styrene | 50 |
| Trimethyl benzyl ammonium chloride (60% concentration in water) | 0.24 |
| Quinone | 0.015 |

Samples of the mixture were catalyzed with a peroxide catalyst and were cured to form clear castings.

*Example III*

In this example, the same polyester and the same polyether resins disclosed in Example I where again employed. They were compounded with styrene and gelation inhibitor in the following composition:

| | Grams |
|---|---|
| Polyester | 60 |
| Glycidyl polyether resin | 40 |
| Styrene | 50 |
| Trimethyl benzyl ammonium chloride (60% concentration in water) | 0.24 |
| Quinone | 0.015 |

Clear castings were again prepared from this material.

*Example IV*

In this example, a polyester was employed which was strongly modified with a non-ethylenic acid and which with styrene, would tend to form a flexible product. This polyester was another commercial product sold under the trade name of Selectron and comprising diethylene glycol 7.18 moles, maleic anhydride 1 mole, adipic acid 6 moles. A glycidyl polyether was added and the product was stabilized with trimethyl benzyl ammonium chloride and quinone. Styrene was added as a monomer to provide the following composition:

| Polyester | moles | 90 |
|---|---|---|
| Glycidyl polyether (Epon 1000) | grams | 10 |
| Styrene | do | 100 |
| Trimethly benzyl ammonium chloride (60% concentration in water) | gram | 0.32 |
| Quinone | do | 0.02 |

Castings were prepared from this composition in the manner specified in Example I. The castings were substantially stiffer than the corresponding control castings formed from the polyester-styrene composition sold as a Selectron resin. The compositions when cured were strongly adherent to glass and it is contemplated that they may be employed to form laminates with the latter.

*Example V*

In this example, the polyester was the same as that disclosed in Example IV. The glycidyl polyether again was Epon resin 1000. These components were stabilized to prevent premature gelation and blended with styrene in the following composition:

| | Grams |
|---|---|
| Polyester | 80 |
| Glycidyl polyether | 20 |
| Styrene | 100 |
| Trimethyl benzyl ammonium chloride (60% concentration in water) | 0.32 |
| Quinone | 0.02 |

The mixture was appropriately catalyzed, cast and cured to provide relatively clear, resinous products.

*Example VI*

The components of the reaction mixture were identical with those of Example IV and the proportions were as follows:

| | Grams |
|---|---|
| Polyester | 60 |
| Glycidyl polyether | 40 |
| Styrene | 100 |
| Trimethyl benzyl ammonium chloride (60% concentration in water) | 0.32 |
| Quinone | 0.02 |

Samples of this material were appropriately catalyzed, cast and cured to provide products which were clear and of substantially greater stiffness than corresponding samples obtained from controls from which the glycidyl polyether had been omitted.

*Example VII*

This example illustrates the reaction of the dicarboxylic acids with the glycol component to provide a polyester, the reaction being effected in the presence of the glycidyl polyether and in the presence of a nonreactive common solvent. The composition was as follows:

| | Grams |
|---|---|
| Phthalic anhydride | 1480 |
| Maleic anhydride | 980 |
| Propylene glycol | 1540 |
| Glycidyl polyether (Epone 1000) | 1242 |
| Xylene (solvent) | 400 |

The mixture was refluxed for 12 hours in order to effect the esterification reaction. Presumably, the esterification reaction included both the propylene glycol and the glycidyl polyether containing residual epoxide groups. The polyester product was appropriately stabilized against premature gelation by a suitable gelation inhibitor and the mixture was blended with styrene in the proportion of 1 part by weight of styrene to 2 parts by weight of the polyester. The blend, suitably catalyzed with a peroxide catalyst of addition reaction, was cured to provide clear, resinous bodies.

*Example VIII*

In this example, a comparison was conducted between a conventional polyester/monomer mixture and a similar mixture which had been modified with a glycidyl polyether containing residual epoxy groups. The polyester resin, in this instance, was the product of esterification of a mixture of 1 mole of maleic anhydride and 6 moles of adipic acid, propylene glycol being employed as the polyhydroxy alcohol. The polyester and styrene were combined in equal parts by weight. This mixture was catalyzed with 0.5 percent of Luperco ATC previously referred to. Castings of the blend were prepared and cured in a glass cell in the manner previously described.

A blend of the same polyester and styrene in a proportion of 90 grams, was mixed with 10 grams of a glycidyl polyether (a commercial product sold at Epon 1004). This mixture was also catalyzed, cast in a cell and cured. The elongation and tensile strength of the samples were then determined. The comparative data of the two samples are as follows:

| | |
|---|---|
| Elongation control sample_____percent__ | 102 |
| Elongation of the glycidyl polyether modified material_____percent__ | 113.7 |
| Tensile strength of the control_____p. s. i__ | 1430 |
| Tensile strength of the polyglicidal modified sample _____pounds p. s. i__ | 1843 |

It will be observed that both the elongation and the tensile strength of the modified product were substantially higher than those of the unmodified sample.

*Example IX*

In this example, comparative tests were conducted of the relative water-resistance of an interpolymer of a polyester and a monomer as compared with a corresponding interpolymer which had been modified with a glycidyl polyether resin. Comparisons were conducted both upon castings and upon laminates.

In one sample, 2 parts of a polyester of propylene glycol and equal moles of maleic anhydride and phthalic anhydride were mixed with 1 part by weight of styrene. To this mixture was added a catalyst of addition reaction in suitable amount. One portion of this material was cast in a cell of the type already described to provide a body which was a clear sheet of ¼ inch thickness. A second sample of the same mixture was employed to impregnate a fiber glass mat. The mat was then cured to provide a reinforced body of ¼ inch thickness. These two bodies were employed as controls.

Two corresponding samples were then prepared from a composition of similar nature, but which contained 20 percent by weight of a glycidyl polyether, namely the commercial product known as Epon 1000. These samples were respectively cast and laminated with glass fibers to provide bodies corresponding to those of the first two samples.

The four samples were then immersed in a tank containing distilled water of a pH value of 6.5. The water was maintained at a temperature of 160 degrees F. under a blanket of air at a pressure of 60 pounds per square inch. A slight leak of air was maintained in the system for purposes of replenishment. At the conclusion of a period of 64 days under these conditions, the casting constituting the control and being the interpolymer of the polyester and the monomer alone had failed badly. The sample had crazed so severely that pieces broke off. The pieces were yellow in color and full of "fish eyes." On the other hand, the casting containing the glycidyl polyether modifier remained intact and the color was only slightly yellowed. The "fish eyes," in this instance, were of very small size.

With respect to the laminates, the control panel had lost its surface gloss and the surface was severely pitted. On the other hand, the laminate which had been modified with the glycidyl polyether retained its surface gloss and showed only a few scattered pits on the surface.

*Example X*

In this example, a glycidyl polyether resin (a commercial product) was modified by interesterification with an alpha-beta ethylenic dicarboxylic acid. A 110 gram portion of Epon 1000 was melted at 62 degrees C. and was mixed with 49 grams of maleic anhydride. The mixture was heated to 140 degrees C. with agitation until a clear, homogeneous mass was formed. The mass was then cooled to room temperature. It was, per se, a useful product which might be catalyzed with benzoyl peroxide or the like and heated in order to cure it into a solid, resistant state. The material could also be mixed with a monomer such as styrene and cured by addition reaction between the monomer and the ethylenic groups of the dicarboxylic acid.

It further was suitable for combination with interpolymerizable blends of polyesters and monomers, illustrated as follows:

A 20 gram sample of the above modified polyether was mixed with 80 grams of an interpolymerizable mixture comprising 50 percent by weight of styrene and 50 percent by weight of a mixed polyester of diethylene glycol and a mixture of 6 moles of adipic acid and 1 mole of maleic acid. The mixture was catalyzed with 3 grams of Luperco ATC. The mixture could be cast or laminated and cured to provide useful resinous products.

*Example XI*

A sample was prepared comprising 40 grams of the maleic anhydride modified glycidyl polyether resin specified in Example X and 60 grams of the same polyester-styrene mixture described in Example IX, together with 3 grams of Luperco ATC.

The materials of Examples X and XI were cast in cells in the manner previously described to provide sheets ⅛ inch thick. Castings were cured at a temperature of 170 degrees F. for one hour and then for 1 hour at 250 degrees F. The resultant cast sheets were clear and were substantially tougher than corresponding sheets obtained by casting a styrene-polyester blend which did not include a glycidyl polyether resin as a modifier.

*Example XII*

In this example the polyester was prepared in the presence of a glycidyl polyether containing terminal epoxy groups as in Example VII. The esterifiable mixture was of the following composition:

| | Grams |
|---|---|
| Phthalic anhydride _____ | 296 |
| Maleic anhydride _____ | 196 |
| Propylene glycol _____ | 308 |
| Acetate ester of a glycidyl polyether (Epon 1000) and having a hydroxy value of 60 _____ | 200 |
| Xylene (inert solvent) _____ | 110 |

This mixture was refluxed for a period of 13 hours or until an acid number of 50 was obtained. Two parts by weight of the ester product were incorporated with 1 part by weight of styrene to form an interpolymerizable mixture having a viscosity of Z2 to Z3. Castings of ¼ inch thickness were prepared from the mixture and cured. They had a Barcol hardness of 35 to 40.

*Example XIII*

This example constitutes a further illustration of the simultaneous esterification reaction of a glycol, a mixture of dicarboxylic acids including maleic acid and a glycidyl polyether of a bis-phenol, said polyether containing residual epoxy groups. The mixture undergoing esterification comprised propylene glycol as the dihydric alcohol and a mixture of equal molar ratios of maleic anhydride and phthalic anhydride. The glycidyl polyether in this instance was a commercial product sold as Epon 1004 and was employed in a proportion of 15 percent by weight based upon the mixture. The composition was heated until a homogeneous ester product was obtained. The product could be polymerized by appropriate heating to provide a resinous body or it could be employed as a coating or impregnating medium.

In the present example, 70.5 parts by weight of the foregoing polyester product containing 0.025 percent by weight of alkyl catechol was incorporated with 29.5 parts by weight of styrene. The mixture was further modified by the incorporation of additional copolymerizable mixture which comprised 50 parts by weight of styrene and a like amount of a polyester of propylene glycol and a mixture of maleic anhydride and adipic acid in the relative proportions of 1 mole of the maleic anhydride to 6 moles of the adipic. The mixture also included 0.5 part by weight of triphenyl phosphite. Benzoyl peroxide in a proportion of 0.5 part by weight was employed as a catalyst.

This mixture was employed to impregnate plies of a conventional fabric of glass fibers, which fabric was known as HG 64 cloth. The cloth was laid up to a thickness of 30 plies and was cured for 20 minutes at a temperature of 220 degrees F. in a press. The physical properties of the resultant laminate were as follows:

| | |
|---|---:|
| Impact [1] _____inch/pounds/inch__ | 39.4 |
| Heat distortion _____degrees C__ | 69.0 |
| Flexural strength _____pounds p. s. i__ | 18,700 |
| Barcol hardness _____ | 43 |

[1] (Impact was determined by ASTM Method D-25647-T.)

Example XIV

In this example, the same glycidyl polyether-modified-polyester disclosed in Example XIII was employed; 56.8 parts by weight of the polyester were mixed with 43.2 parts by weight of styrene and 0.014 part by weight of alkyl catechol. The properties of the resultant laminate were as follows:

| | |
|---|---:|
| Impact _____inch/pounds/inch__ | 44.4 |
| Heat distortion _____degrees C__ | 81 |
| Flexural strength _____pounds p. s. i__ | 12,440 |
| Barcol hardness _____ | 48 |

Example XV

In this example, 10 percent by weight of Epon 1004 was employed in lieu of the 15 percent disclosed in Example XIII; 60 parts by weight of the resultant modified polyester was incorporated with 40 parts by weight of styrene and the mixture was stabilized with 0.015 percent by weight based upon the polyester, of alkyl substituted catechol. The resultant copolymerizable mixture was further incorporated with 20 percent by weight of the same copolymerizable mixture of styrene and propylene-maleate-adipate disclosed in Example XIII. A laminate was prepared from this material as in Example XIII. The properties of the product were as follows:

| | |
|---|---:|
| Impact _____inch/pounds/inch__ | 44.4 |
| Flexural strength _____pounds p. s. i__ | 15,200 |
| Heat distortion _____degrees C__ | 88 |
| Barcol hardness _____ | 50 |

Example XVI

In this example, a composition comprising:

| | Grams |
|---|---:|
| Epon 1000 _____ | 440 |
| Maleic anhydride _____ | 392 |
| Butyl alcohol _____ | 592 |
| Xylene _____ | 100 |
| Hydroquinone _____ | 0.166 |

The mixture was refluxed at 143 to 173 degrees C. until 49 milliliters of water had been removed. The product was then blown with inert gas until an acid number of 10.4 was obtained. The solvent was distilled at a pressure of 2 mm. (absolute) and at a pot temperature of 195 degrees C. The product may be considered as a mixed ester of the maleic acid, Epon resin and butyl alcohol.

A 17 gram quantity of this mixed ester was mixed with 33 grams of a polyester of 7.18 moles diethylene glycol, 1 mole of maleic anhydride and 6 moles of adipic anhydride and the mixture was blended with 50 grams of styrene and 0.01 gram of hydroquinone. When the mixture was to be cured, 3 percent by weight of Luperco ATC was added. The catalyzed mixture was spread as a film of 20 mil thickness and was baked for 1 hour at 170 degrees F. and for an additional hour at 250 degrees F. Unnotched samples of the material showed an elongation of 125 percent and a tensile strength of 1400 pounds per square inch.

Example XVII

The glycidyl polyether-modified-polyester of this example was prepared by the reaction of propylene glycol and equal moles of maleic acid and phthalic acid in the presence of 10 percent by weight of a polyether known as Epon 1000. The mixture was stabilized against premature gelation by the addition of 0.02 part by weight base upon the polyester components of an alkyl catechol and to 70.5 parts by weight of the mixture, was added 29.5 parts by weight of styrene to provide an interpolymerizable product. This product was further admixed with 20 parts by weight of the same propylene adipate-maleate referred to in the preceding examples. The mixture was catalyzed with 1 percent by weight of benzoyl peroxide and was employed in the preparation of a 30-ply laminate of glass-fiber fabric. The cured laminate had an impact resistance of 40.4 inch/pounds/inch.

Example XVIII

In this example, a glycidyl polyether known as Epon 1009 was esterified with acetic acid. 10 percent by weight of this ester was incorporated into a mixture of propylene glycol and equal moles of maleic acid and phthalic acid and esterification was then conducted. With 61.8 parts by weight of this ester product was incorporated 38.2 parts by weight of styrene and 0.016 part by weight of alkyl-substituted catechol. This mixture was further modified with the same copolymerizable mixture of styrene and adipate maleate referred to in Example XIII. Castings of the product were prepared as in the preceding examples. The castings, when cured, had a flexural value of 14,410 pounds p. s. i. and had an impact value of 39.9 inch/pound/inch.

Example XIX

In this example, a polyester was prepared comprising propylene glycol as the polyhydric alcohol, maleic acid in the ratio of 3 moles and phthalic acid in the ratio of 2 moles. To the mixture was added 15 percent by weight based upon the mixture of a glycidyl polyether of a bisphenol. This ether was a commercial product sold under the trade name of Araldite A. The Araldite A corresponded to the Epon resins previously described and is understood to be the product of the Ciba Corporation. A mixture of 54.6 parts by weight of this polyester, 45.4 parts by weight of styrene and 0.014 part by weight of alkyl-substituted catechol was prepared and the mixture was employed to prepare laminates of glass-fiber fabrics as in the preceding examples. The cured product has an impact value of 27.7 inch/pounds/inch, a heat distortion of 108 degrees C., a flexural strength of 13,650 pounds p. s. i. and a Barcol hardness of 45.

Example XX

A polyester was prepared from propylene glycol and 1 mole of maleic acid, 6 moles of adipic acid and 10 percent by weight of Epon 1004. The ester product in a proportion of 50 parts by weight, was mixed with 50 parts by weight of styrene and 0.0075 part by weight of hydroquinone. The resultant mixture was cured as a sheet which had a tensile strength of 1,215 pounds p. s. i. and elongation of 111 percent, a modulus of stiffness of 4700 pounds p. s. i., and a water absorption of 0.45 percent over a period of 48 hours at 77 degrees F.

The embodiments of the invention herein disclosed are to be considered as being by way of example. It will be apparent to those skilled in the art that numerous modifications may be made therein without departure from the spirit of the invention or the scope of the appended claims.

I claim:
1. A polymerizable mixture consisting essentially of (A) styrene and (B) a polyester obtained by reacting a glycol of a class consisting of propylene glycol and diethylene glycol and a mixture of maleic acid and an acid of a class consisting of phthalic acid and adipic acid, said polyester being reacted with a glycidyl polyether formed by reaction of p,p'-isopropylidenediphenol and epichlorohydrin in the presence of alkali.

2. A polymerizable mixture of styrene and a reaction product obtained by heating a mixture consisting essentially of (1) glycidyl polyether which is the reaction product of epichlorohydrin and p,p'-isopropylidenediphenol in the presence of alkali and (2) a mixture of a glycol of a class consisting of propylene glycol and diethylene glycol and (3) a mixture of maleic acid and an acid of a class consisting of phthalic acid and adipic acid.

3. A polymerizable mixture of (A) styrene and (B) a reaction product obtained by heating a mixture of (B') a glycidyl polyether formed by reacting, in the presence of alkali, p,p'-isopropylidenediphenol and epichlorohydrin and (B'') a material of a class consisting of (I) an esterifiable mixture of a (1) glycol of a class consisting of propylene glycol and diethylene glycol and (2) a mixture of maleic acid and an acid of a class consisting of phthalic acid and adipic acid and (II) the preformed polyester of esterifiable mixture (I).

References Cited in the file of this patent

UNITED STATES PATENTS

| | | |
|---|---|---|
| 2,255,313 | Ellis | Sept. 9, 1941 |
| 2,324,483 | Castan | July 20, 1943 |
| 2,411,029 | De Groote et al. | Nov. 12, 1946 |
| 2,437,046 | Rothrock et al. | Mar. 2, 1948 |
| 2,591,539 | Greenlee | Apr. 1, 1952 |
| 2,623,023 | Koroly | Dec. 23, 1952 |
| 2,662,070 | Kass et al. | Dec. 8, 1953 |
| 2,674,648 | Nicodemus | Apr. 6, 1954 |
| 2,691,007 | Cass | Oct. 5, 1954 |
| 2,707,177 | Skiff et al. | Apr. 26, 1955 |

OTHER REFERENCES

Electrical Manufacturing, article at pages 78 to 81, 164, 166, July 1949.

Paint, Oil and Chemical Review, article at pages 15 to 18, 48 and 49, November 9, 1950.